United States Patent [19]

Nakano et al.

[11] Patent Number: 4,983,642

[45] Date of Patent: Jan. 8, 1991

[54] FOAMABLE SILICONE RUBBER COMPOSITION AND FOAMED SILICONE RUBBER BODY THEREFROM

[75] Inventors: Akio Nakano; Hirosi Takei, both of Gunma, Japan

[73] Assignee: Shin-Etsu Chemical Co., Ltd., Tokyo, Japan

[21] Appl. No.: 534,061

[22] Filed: Jun. 6, 1990

[30] Foreign Application Priority Data

Jun. 7, 1989 [JP] Japan ................................. 1-144470

[51] Int. Cl.$^5$ .......................... C08G 77/00; C08J 9/10
[52] U.S. Cl. ........................................ 521/88; 521/91; 521/95; 521/96; 521/122; 521/154; 521/89; 528/24
[58] Field of Search ..................... 521/91, 122, 96, 88, 521/95, 89, 154; 528/24

[56] References Cited

U.S. PATENT DOCUMENTS

| | | | |
|---|---|---|---|
| 4,461,851 | 7/1984 | Hashimoto | 521/154 |
| 4,490,488 | 12/1984 | Cash | 521/154 |
| 4,719,243 | 1/1988 | Pocknell | 521/154 |
| 4,767,794 | 8/1988 | Modic | 521/154 |
| 4,808,634 | 2/1989 | Urierte et al. | 521/154 |
| 4,840,974 | 6/1989 | Gross et al. | 521/154 |
| 4,951,452 | 7/1989 | Gross et al. | 521/154 |

Primary Examiner—Morton Foelak
Attorney, Agent, or Firm—Millen, White & Zelano

[57] ABSTRACT

The invention provides a foamable silicon rubber composition capable of giving a foamed and cured silicone rubber body which exhibits, different from conventional foamed silicone rubbers, a retarded and controlled rate of elastic recovery from a compressed state when the compressive force is released so as to be useful for certain applications. This unique characteristic of the foamed silicon rubber can be obtained by formulating the composition, besides conventional ingredients, a low molecular-weight organopolysiloxane represented by the general formula $HO-(-SiR^1_2-O-)_m-(-SiMe_2-O-)_n-H$, in which Me is a methyl group, $R^1$ is an unsubstituted or substituted monovalent hydrocarbon group, at least one of the groups denoted by $R^1$ in each of the units of the formula $-SiR^1_2-O-$ being a phenyl group or an alkyl group having 2 to 10 carbon atoms, the subscript m is a positive integer not exceeding 10 and the subscript n is zero or a positive integer not exceeding 20 with the proviso that $m+n$ is at least 2, in a limited amount.

6 Claims, No Drawings

FOAMABLE SILICONE RUBBER COMPOSITION AND FOAMED SILICONE RUBBER BODY THEREFROM

BACKGROUND OF THE INVENTION

The present invention relates to a foamable silicone rubber composition and a foamed silicone rubber body from the composition. More particularly, the invention relates to a foamable silicone rubber composition capable of giving a cured and foamed silicone rubber body having a controlled low rate of recovery from elastic compression so as to return to the uncompressed state taking a length of time and to be useful as a material of earplugs for sound deadening or swimming as well as vibration- and impact-absorbing materials, sound-insulating materials, medical pads, cushions and the like used in industries, medical treatments, sporting goods and elsewhere.

Typical foamable silicone rubber compositions known in the prior art are prepared by compounding a silicone rubber composition comprising an organopolysiloxane and a finely divided silica filler with an organic blowing agent, such as azobisisobutyronitrile, azodicarbonamide and the like, and an organic peroxide as a curing agent. Such a foamable silicone rubber composition can be foamed and cured by heating to give a foamed silicone rubber body. The foamed silicone rubber bodies thus obtained are usually excellent as an elastic material and, when the body under compression is released from the compressive force, the body immediately regains the uncompressed form within only a few seconds. Although such a rapid elastic recovery from the compressed state is not always disadvantageous, foamed silicone rubber bodies are sometimes desired to show a slow rate of elastic recovery from the compressed state, for example, in the above mentioned applications.

Known foamable silicone rubber compositions of another class are formulated with a vinyl-containing organopolysiloxane having vinyl groups bonded to the silicon atoms, an organohydrogenpolysiloxane having hydrogen atoms directly bonded to the silicon atoms, a platinum-based catalytic compound and a thermally decomposable organic blowing agent which produces a gaseous decomposition product (see, for example, Japanese Patent Publication No. 45-12675). A problem in the foamable silicone rubber compositions of this class is that the expansion of the composition by foaming is limited not to give a foamed rubber body of high expansion as desired.

Foamable silicone rubber compositions of a further known class utilize the dehydrogenation condensation reaction between a polyhydroxy organopolysiloxane and an organohydrogenpolysiloxane as mentioned above in the presence of a catalyst which may be an organic acid salt of a heavy metal or a quaternary ammonium salt (see, for example, Japanese Patent Publication No. 44-8875). A problem in the foamed silicone rubber body obtained from these compositions is that the body is sometimes too rigid with little elastic resilience in addition to the disadvantage that the organopolysiloxane is subject to depolymerization or degradation when it is brought into contact with water or steam at high temperatures to cause a great loss in the properties as a rubber so that the application fields of these compositions are rather limited.

The inventors have previously discovered that a foamable silicone rubber composition comprising a vinyl-containing dimethylpolysiloxane having vinyl groups bonded to the silicon atoms, an organohydrogenpolysiloxane having hydrogen atoms directly bonded to the silicon atoms, a thermally decomposable organic blowing agent and an organic peroxide can give a foamed silicone rubber body having a controlled rate of elastic recovery from a compressed state by heating to cause foaming and curing when the composition is further admixed with a copolymer of boric acid and a dimethylpolysiloxane terminated at the molecular chain ends with methoxy groups. Though quite effective for controlling the retarded rate of elastic recovery at least immediately after preparation of the foamed body, the effect is gradually lost when the foamed rubber body is stored for a length of time of, for example, three months or longer or when the foamed rubber body is soaked with water so that the foamed rubber body under compression rapidly regains the uncompressed state by releasing the compressive force. Therefore, it is eagerly desired to develop a foamable silicone rubber composition capable of giving a foamed silicone rubber body having a permanently controlled retarded rate of elastic recovery from compression.

SUMMARY OF THE INVENTION

The present invention accordingly has an object to provide a novel foamable silicone rubber composition capable of giving a foamed and cured silicone rubber body which exhibits with stability a retarded rate of elastic recovery from a compressed state when the compressive force is released.

Thus, the foamable silicone rubber composition of the invention comprises, as a blend:

(a) 100 parts by weight of an organopolysiloxane represented by the average unit formula $$R_a SiO_{(4-a)/2}, \qquad (I)$$

in which R is an unsubstituted or substituted monovalent hydrocarbon group and the subscript $a$ is a positive number in the range from 1.98 to 2.05, having an average degree of polymerization of at least 300;

(b) from 10 to 150 parts by weight of a finely divided silica powder having a specific surface area of at least 50 m²/g;

(c) from 3 to 20 parts by weight of an $\alpha,\omega$-dihydroxy diorganopolysiloxane represented by the general formula $$HO-(-SiR^1_2-O-)_m-(-SiMe_2-O-)_n-H, \qquad (II)$$

in which Me is a methyl group, $R^1$ is an unsubstituted or substituted monovalent hydrocarbon group, at least one of the two groups denoted by $R^1$ in each of the units of the formula $-SiR^1_2-O-$ being a phenyl group or an alkyl group having 2 to 10 carbon atoms, the subscript m is a positive integer not exceeding 10 and the subscript n is zero or a positive integer not exceeding 20 with the proviso that m+n is at least 2;

(d) from 0.1 to 40 parts by weight of a thermally decomposable organic blowing agent; and (e) from 0.1 to 10 parts by weight of an organic peroxide.

DETAILED DESCRIPTION OF THE PREFERRED EMBODIMENTS

As is described above, the inventive foamable silicone rubber composition comprises, as the essential ingredients, the above defined components (a) to (e) each in a specified amount. The most characteristic component among these essential ingredients is the component (c). Namely, the rate of the elastic recovery from a compressed state of the foamed silicone rubber body can be freely controlled by adequately selecting the type and amount of this component in the composition.

The component (a) is an organopolysiloxane represented by the average unit formula $$R_a SiO_{(4-a)/2}. \quad (I)$$

In the formula, R is an unsubstituted or substituted monovalent hydrocarbon group having, preferably, 1 to 10 carbon atoms or, more preferably, 1 to 8 carbon atoms exemplified by alkyl groups, e.g., methyl, eth-yl, propyl and butyl groups, cycloalkyl groups, e.g., cyclohexyl group, alkenyl groups, e.g., vinyl, allyl and isopropenyl groups, and aryl groups, e.g., phenyl and tolyl groups, as well as those substituted groups obtained by replacing a part or all of the hydrogen atoms in the above named hydrocarbon groups with halogen atoms, cyano groups and the like, e.g., chloromethyl, 3,3,3-trifluoropropyl and 2-cyanoethyl groups. It is preferable that at least 50% by moles of the groups denoted by R in a molecule are methyl groups. Further, it is preferably that from 3 to 50% by moles of the groups denoted by R are phenyl groups in respect of the controllability of the rate of elastic recovery of the foamed rubber body prepared from the composition. The subscript $a$ is a positive number of 1.95 to 2.05. Basically, the organopolysiloxane should be a diorganopolysiloxane having a straightly linear molecular structure although a branched structure may have no particularly adverse influences if not so predominant. The organopolysiloxane should have an average degree of polymerization of at least 300. Such an organopolysiloxane usually has a viscosity of about 1000 centistokes at 25° C. or larger. It is preferable that this component is a high-polymeric organopolysiloxane having a gum-like consistency with an average degree of polymerization much larger than 300. The terminal-blocking group at each of the molecular chain ends of the organopolysiloxane can be a silanol group, dimethyl vinyl siloxy group, methyl divinyl siloxy group, trivinyl siloxy group, trimethyl siloxy group, methyl phenyl vinyl siloxy group and the like though not particularly limitative thereto. It is preferably that the terminal-blocking group has one or more of vinyl groups bonded to the terminal silicon atom in respect of the improved mechanical strength of the foamed and cured silicone rubber body.

The component (b) as the second essential component in the inventive composition is a finely divided silica filler which can be any of conventional silica fillers used in the formulation of silicone rubbers including fumed silica and precipitated silica. The silica filler should have a specific surface area of at least 50 m²/g in order to exhibit a full reinforcing effect on the silicone rubber and to obtain the desired effect of control on the rate of elastic recovery from a compressed state. To explain it more, the reinforcing effect of a silica filler on a silicone rubber is exhibited as a consequence of the interaction between the organopolysiloxane molecules and the surface of the silica particles such as the hydrogen bond formation between the hydroxy groups on the silica particles and the organopolysiloxane molecules or entanglement of the polymer molecules in and around the interstices in the silica filler while such a interaction is modulated by the molecules of the hydroxy-terminated organopolysiloxane as the component (c) so that the modulating effect can be exhibited only insufficiently when the specific surface area of the silica filler is too small.

The amount of the silica filler as the component (b) in the inventive composition is in the range from 10 to 150 parts by weight or, preferably, from 20 to 80 parts by weight per 100 parts by weight of the organopolysiloxane as the component (a). When the amount of the silica filler is too small, the desired effects mentioned above cannot be fully exhibited. When the amount thereof is too large, on the other hand, the foamed silicone rubber body obtained from the composition would be too rigid if not to mention the difficulty encountered in compounding a so large amount of the silica filler.

The α,ω-dihydroxy-terminated organopolysiloxane as the component (c) is represented by the general formula $$HO-(-SiR^1_2-O-)_m-(-SiMe_2-O-)_n-H. \quad (II)$$

In the formula, Me is a methyl group, $R^1$ is, like R in the formula (I), an unsubstituted or substituted monovalent hydrocarbon group having 1 to 10 carbon atoms, the subscript m is a positive integer not exceeding 20 and the subscript n is zero or a positive integer not exceeding 20 with the proviso that m+n is at least 2. It is essential that at least one of the two $R^1$ groups in each of the siloxane units (—SiR$^1_2$—O—) is a phenyl group or an alkyl group having 2 to 10 carbon atoms since otherwise the desired effect on the rate of elastic recovery from a compressed state would be exhibited only insufficiently. When at least one of the groups $R^1$ is a phenyl group or an alkyl group of 2 to 10 carbon atoms, the organopolysiloxane as the component (c) would have a decreased compatibility or miscibility with the organopolysiloxane as the component (a) so that the molecules of the component (c) could gather around the particles of the silica filler as the component (b).

For example, the α,ω-dihydroxy-terminated organopolysiloxane as the component (c) may be expressed by one of the following structural formulas, in which the symbols Me and Ph denote a methyl group and a phenyl group, respectively, the subscript p is an integer of 1 to 4, q is zero or an integer of 1 to 4 with the proviso that p+q is at least 2 and r is an integer of 4 to 6:

$$HO-[-SiPh_2-O-]_p-[-SiMe_2-O-]_q-H;$$

$$HO-[-SiMe(C_4H_9)-O-]_p-[-SiMe_2-O-]_q-H;$$

$$HO-[-SiMePh-O-]_r-H; \text{ and}$$

$$HO-[-SiMe(CH_2CH_2CF_3)-O-]_r-H.$$

The amount of the above defined component (c) compounded in the inventive composition is in the range from 3 to 20 parts by weight per 100 parts by weight of the organopolysiloxane as the component (a). When the amount thereof is too small, the desired controlling effect on the rate of elastic recovery of the foamed silicone rubber body would be insufficient as a matter of course. When the amount thereof is too large, on the other hand, the foamed silicone rubber body obtained from the composition would have poor mechanical properties.

The component (d) in the inventive composition is a thermally decomposable organic blowing agent which is essential in order to form the cellular foamed structure of the rubber. Various known organic compounds capable of producing an inert gas, e.g., nitrogen, by thermal decomposition can be used for the purpose including dinitropentamethylene tetramine, azodicarbonamide, p-toluene sulfonyl hydrazide, 4,4'-dihydroxy bisbenzenesulfonyl hydrazide, azobisisobutyronitrile and the like. The amount of the blowing agent compounded in the composition naturally depends on the desired degree of foaming expansion of the composition but it is usually in the range from 0.1 to 40 parts by weight or, preferably, from 1 to 20 parts by weight per 100 parts by weight of the organopolysiloxane as the component (a). When the amount thereof is too large, the cellular structure of the foamed rubber body cannot be uniform and dense.

The component (e) in the inventive composition is an organic peroxide which serves as a vculcanizing or curing agent of the organopolysiloxane. Various known organic peroxides can be used as the component (e) including benzoyl peroxide, p-chlorobenzoyl peroxide, 2,4-dichlorobenzoyl peroxide, di-tert-butyl peroxide, 2,5-dimethyl-2,5-di(tert-butylperoxy) hexane, tert-butyl perbenzoate, tert-butyl cumyl peroxide and the like. The amount of the organic peroxide as the component (e) in the inventive composition is in the range from 0.1 to 10 parts by weight per 100 parts by weight of the organopolysiloxane as the component (a). When the amount thereof is too small, the composition cannot be fully cured not to have a high mechanical strength. When the amount thereof is too large, on the other hand, the workability of the uncured composition would be somewhat decreased and the rubbery properties of the foamed silicone rubber body would be poor due to the adverse influences of the decomposition products of the peroxide.

The foamable silicone rubber composition of the present invention can be prepared by first compounding the above described components (a), (b) and (c) uniformly by using a two-roller mill, kneader, Banbury mixer and the like and the mixture is subjected to a heat treatment and then cooling to room temperature followed by the admixture of the components (d) and (e) by using a two-roller mill and the like. It is optional that the composition is further admixed according to need with various kinds of known additives including heat-resistance improvers such as titanium dioxide, iron oxide, ceric oxide and the like, inorganic non-reinforcing fillers such as quartz powder, diatomaceous earth and the like, coloring agents, i.e. pigments, and so on. The thus prepared inventive foamable silicone rubber composition is shaped into a desired form by using a suitable machine such as rubber extruders, calendering rollers and the like and the shaped composition is heated at a temperature sufficiently high to cause decomposition of the organic blowing agent and the organic peroxide so as to effect foaming and curing of the composition giving a foamed silicone rubber body which is, if necessary, subjected to a post-curing treatment by heating and finishing by trimming.

The foamed and cured silicone rubber body obtained in the above described manner is a body of high foaming expansion of 200 to 400% by volume depending on the amount of the organic blowing agent. The structure of the foamed rubber mainly consists of closed cells so that, when an open-cell structure of the foam is desired with an object to control the rate of elastic recovery from compression, the foamed rubber is mechanically compressed by using a press, two-roller mill and the like to destroy the cell walls to such an extent that, for example, at least 50% of the air or gas contained in the cells is pressed out or squeezed out.

By virtue of the unique formulation of the composition, the foamed and cured silicone rubber body of the invention exhibits a moderately decreased rate of elastic recovery from a compressed state to the uncompressed form usually taking 15 to 200 seconds. The elastic recoverability is so stable that the length of time taken for the elastic recovery of the inventive foamed silicone rubber body under compression is 10 to 180 seconds even after storage for 3 months from preparation of the foamed body. The elastic recoverability is little affected by soaking the foamed body with water and a time of 10 to 180 seconds is taken for the elastic recovery even when the foamed silicone rubber body is soaked with water. In addition to this feature in the elastic recoverability, the inventive foamed silicone rubber body contains no toxic ingredients so that the inventive composition is particularly useful as a material of earplugs and pads or cushions for medical use though not limited thereto including vibration and shock absorbing materials for industrial machines, automobiles, aircrafts and the like and shock-absorbing materials in sporting goods.

In the following, the present invention is described in more detail by way of Examples and Comparative Examples, in which the term of "parts" always refers to "parts by weight".

EXAMPLE 1

A base compound was prepared by uniformly blending, on a two-roller mill, 100 parts of a methyl phenyl vinyl polysiloxane gum having an average degree of polymerization of about 8000 and composed of 89.8% by moles of the dimethyl siloxane units $Me_2SiO$, 10% by moles of the diphenyl siloxane units $Ph_2SiO$ and 0.2% by moles of the methyl vinyl siloxane units MeViSiO, the symbols Me, Ph and Vi denoting a methyl, phenyl and vinyl group, respectively, 40 parts of a finely divided fumed silica filler having a specific surface area of 200 $m^2/g$ (Aerosil 200, a product by Nippon Aerosil Co.) and 10 parts of 1,7-dihydroxy-1,3,5,7-tetramethyl-1,3,5,7-tetraphenyl tetrasiloxane expressed by the chemical formula HO—(—SiMePh—O—)$_4$—H. The base compound was subjected to a heat treatment at 150° C. for 2 hours in a kneader. After cooling to room temperature, the base compound was further admixed with 5 parts of an organopolysiloxane-based compound containing 50% by weight of azobisisobutyronitrile (KE-P-13, a product by Shin-Etsu Chemical Co.), 0.5 part of a pasty compound of a silicone fluid containing 50% by weight of 2,4-dichlorobenzoyl peroxide (C-2, a product by the same company, supra) and 3 parts of an organopolysiloxane-based compound containing 25% by weight of tert-butylperoxy benzoate (C-5, a product of the same company, supra) by using a two-roller mill.

The thus prepared foamable silicone rubber composition was then sheeted into a 7 mm thick sheet from which a 100 mm by 100 mm wide test piece was taken by cutting and heated in an air oven at 200° C. for 30 minutes to be expanded and cured into a foamed rubber sponge sheet having dimensikons of about 20 mm by 140 mm by 140 mm. This foamed spongy body was further subjected to a post-treatment by heating at 200° C. for additional one hour. The sponge rubber sheet was passed through a 3 mm wide roller gap of a two-roller mill so as to collapse the closed cell walls. The thus obtained sponge rubber sheet of open-cell structure was subjected to the measurement of the mechanical properties to give the results including a hardness, Ascar C, of 15, ultimate elongation of 200% and tensile strength of 8 kg/cm$^2$. A cylindrical specimen having a diameter of 13.7 mm for the test of the elastic recovery prepared by punching the sponge rubber sheet was sandwiched with two steel plates of 50 mm by 50 mm square and 1 mm thick and compressed to have a thickness of 4 mm. After keeping for 30 seconds in this compressed state, the steel plates were removed to determine the recovery time taken before the compressed specimen regained the uncompressed state. The recovery time of the specimen as prepared was 45 seconds while the time was decreased to 43 seconds by storing the specimen for 3 months at room temperature. The elastic recovery time of the test specimen as prepared was 40 seconds when the specimen was soaked with water.

EXAMPLE 2

The experimental procedure was substantially the same as in Example 1 described above except that 40 parts of a quartz powder having a specific surface area of 1.9 m$^2$/g (Crystalite VX-S, a product by Tatsumori Co.) were admixed with the base compound before admixture of the blowing agent and organic peroxides. The thus prepared rubber sponge sheet had mechanical properties of: hardness, Ascar C, of 23; ultimate elongation of 240% and tensile strength of 5 kg/cm$^2$. The recovery time of the sheet as prepared was 30 seconds while the time was decreased to 25 seconds by storing the specimen for 3 months at room temperature. The elastic recovery time of the test specimen as prepared was 25 seconds when the specimen was soaked with water.

COMPARATIVE EXAMPLE 1

A foamable silicone rubber composition was prepared in substantially the same manner as in Example 1 excepting replacement of the methyl phenyl vinyl polysiloxane gum with the same amount of a methyl vinyl polysiloxane gum having an average degree of polymerization of about 8000 as composed of 99.82% by moles of dimethyl siloxane units Me$_2$SiO and 0.18% by moles of methyl vinyl siloxane units MeViSiO, Me and Vi each denoting a methyl and a vinyl group, respectively, replacement of the fumed silica filler with the same amount of a precipitated silica filler having a specific surface area of 230 m$^2$/g (Nipsil LP, a product by Nippon Silica Co.), replacement of the 1,7-dihydroxy-1,3,5,7-tetramethyl-1,3,5,7-tetraphenyl tetrasiloxane with 3.5 parts of dimethyl dimethoxy silane and replacement of the tert-butylperoxy benzoate-containing compound with the same amount of another organopolysiloxane-based compound containing 20% by weight of dicumyl peroxide (C-3, a product by the same company, supra).

The thus obtained foamable silicone rubber composition was subjected to foaming and curing in the same manner as in Example 1. The foamed sponge rubber sheet of about 20 mm thickness had a hardness, Ascar C, of 12; ultimate elongation of 240% and tensile strength of 9 kg/cm$^2$. The recovery time of the sheet as prepared was only 2 seconds, which was not changed by storing the specimen for 3 months or by soaking the specimen with water.

COMPARATIVE EXAMPLE 2

A blend was prepared by uniformly blending, in a kneader, 100 parts of a methyl vinyl polysiloxane gum having an average degree of polymerization of about 8000 as composed of 99.90% by moles of dimethyl siloxane units Me$_2$SiO and 0.10% by moles of methyl vinyl siloxane units MeViSiO, 12 parts of Nipsil LP (see Comparative Example 1), 18 parts of Aerosil 200 (see Example 1), 2.5 parts of an α,ω-dihydroxy dimethyl polysiloxane fluid having a degree of polymerization of 10, 1 part of dimethyl dimethoxy silane and 0.5 part of vinyl trimethoxy silane. The blend was aged by heating at 150° C. for 2 hours. After cooling to room temperature, the blend was further admixed with 65 parts of the same quartz powder as used in Example 2 on a two-roller mill to prepare a base compound.

Thereafter, the thus prepared base compound was admixed on a two-roller mill with 5 parts of the paste of azobisisobutyronitrile KE-P-13 (see Example 1), 1.5 parts of 1,3,5,7-tetramethyl cyclotetrasiloxane, 0.3 part of a copolymer of methoxy-terminated dimethyl polysiloxane and boric acid, 0.5 part of a first organic peroxide paste C-2 (see Example 1) and 3 parts of a second organic peroxide paste C-5 (see Example 1) to give a foamble silicone rubber composition.

The thus obtained foamable silicone rubber composition was subjected to foaming and curing in the same manner as in Example 1. The foamed sponge rubber sheet of about 20 mm thickness had a hardness, Ascar C, of 20; ultimate elongation of 260% and tensile strength of 7 kg/cm$^2$. The recovery time of the sheet as prepared was 60 seconds while the time was decreased to 15 seconds by storing the specimen for 3 months at room temperature. The elastic recovery time of the test specimen as prepared was 10 seconds when the specimen was soaked with water.

What is claimed is:

1. A foamable silicone rubber composition which comprises, as a blend:
   (a) 100 parts by weight of an organopolysiloxane represented by the average unit formula $$R_aSiO_{(4-a)/2},$$

in which R is an unsubstituted or substituted monovalent hydrocarbon group and the subscript α is a positive number in the range from 1.98 to 2.05, having an average degree of polymerization of at least 300;
   (b) from 10 to 150 parts by weight of a finely divided silica powder having a specific surface area of at least 50 m$^2$/g;
   (c) from 3 to 20 parts by weight of an α,ω-dihydroxy diorganopolysiloxane represented by the general formula $$HO-(-SiR^1{}_2-O-)_m-(-SiMe_2-O-)_n-H,$$

in which Me is a methyl group, R$^1$ is an unsubstituted or substituted monovalent hydrocarbon group, at least one of the groups denoted by R$^1$ in each of the units of the formula —SiR$^1_2$—O— being a phenyl group or an alkyl group having 2 to 10 carbon atoms, the subscript m is a positive integer not exceeding 10 and the subscript n is zero or a positive integer not exceeding 20 with the proviso that m+n is at least 2;

(d) from 0.1 to 40 parts by weight of a thermally decomposable organic blowing agent; and (e) from 0.1 to 10 parts by weight of an organic peroxide.

2. The foamable silicone rubber composition as claimed in claim 1 wherein at least 50% by moles of the groups denoted by R in the component (a) are methyl groups.

3. The foamable silicone rubber composition as claimed in claim 1 wherein from 3 to 50% by moles of the hydrocarbon groups denoted by R in the component (a) are phenyl groups.

4. The foamable silicone rubber composition as claimed in claim 1 wherein the α,ω-dihydroxy diorgano-polysiloxane as the component (c) is a compound represented by a general formula

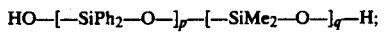

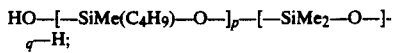

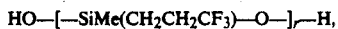

in which the symbols Me and Ph denote a methyl group and a phenyl group, respectively, the subscript p is an integer of 1 to 4, the subscript q is zero or an integer of 1 to 4 with the proviso that p+q is at least 2 and the subscript r is an integer of 4 to 6.

5. The foamable silicone rubber composition as claimed in claim 1 wherein the component (c) is 1,7-dihydroxy-1,3,5,7-tetramethyl-1,3,5,7-tetraphenyl tetrasiloxane.

6. A foamed silicone rubber body which is a foamed and cured product of a foamable silicone rubber composition according to claim 1.

* * * * *